(12) United States Patent
Chang

(10) Patent No.: US 6,621,698 B2
(45) Date of Patent: Sep. 16, 2003

(54) COMPUTER ASSEMBLY PROVIDING COOLING FOR MORE THAN ONE ELECTRONIC COMPONENT

(75) Inventor: Je-Young Chang, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 43 days.

(21) Appl. No.: 09/870,003

(22) Filed: May 29, 2001

(65) Prior Publication Data

US 2002/0181200 A1 Dec. 5, 2002

(51) Int. Cl.[7] .................................................. H05K 7/20
(52) U.S. Cl. ....................................................... 361/687
(58) Field of Search ................................. 361/687, 699, 361/700; 165/80.4, 104.33, 185, 80.3; 62/259.2; 174/15.2

(56) References Cited

U.S. PATENT DOCUMENTS

| | | | | |
|---|---|---|---|---|
| 5,690,468 A | * | 11/1997 | Hong | .......................... 165/121 |
| 5,930,115 A | * | 7/1999 | Tracy et al. | ................. 361/704 |
| 6,152,213 A | * | 11/2000 | Suzuki | ................... 165/104.26 |
| 6,226,178 B1 | * | 5/2001 | Broder et al. | ........... 165/104.33 |
| 6,227,286 B1 | * | 5/2001 | Katsui | ........................ 165/80.3 |
| 6,311,767 B1 | * | 11/2001 | Inoue et al. | ........... 165/104.33 |
| 6,328,097 B1 | * | 12/2001 | Bookhardt et al. | ..... 165/104.33 |
| 6,351,382 B1 | * | 2/2002 | Nakanishi et al. | ......... 165/80.3 |
| 6,408,934 B1 | * | 6/2002 | Ishida et al. | ........... 165/104.33 |

* cited by examiner

*Primary Examiner*—Darren Schuberg
*Assistant Examiner*—Anthony Q. Edwards
(74) *Attorney, Agent, or Firm*—Blakely, Sokoloff, Taylor & Zafman LLP

(57) ABSTRACT

A computer assembly is described having a metal plate which provides additional cooling for an electronic component such as a chipset or a graphic chip. The computer assembly may for example be retrofitted with the metal plate. The metal plate has a cross-sectional area which is sufficiently large and is made of a material which provides for a large amount of heat to be conducted. The metal plate is sufficiently thin to allow the metal plate to be bent or otherwise deformed to allow for proper fitting between surfaces that are at different elevations.

13 Claims, 3 Drawing Sheets

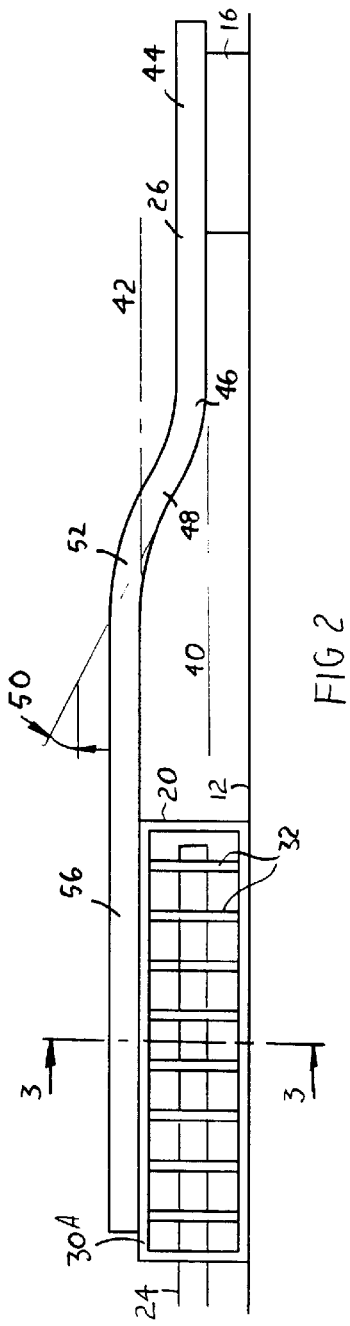
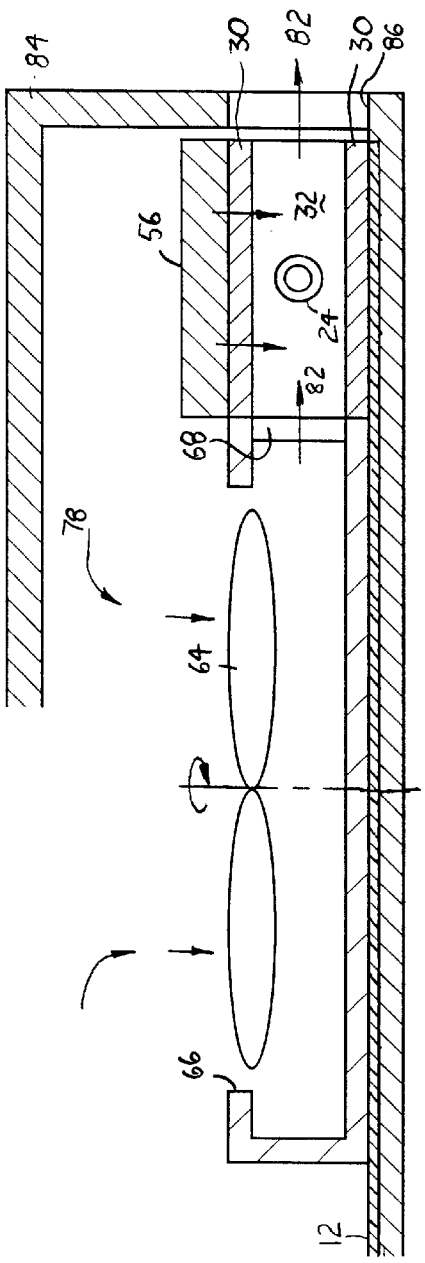

COMPUTER ASSEMBLY PROVIDING COOLING FOR MORE THAN ONE ELECTRONIC COMPONENT

BACKGROUND OF THE INVENTION

1). Field of the Invention

This invention relates to a computer assembly and its cooling.

2). Discussion of Related Art

Logic processors of computer assemblies usually generate large amounts of heat and provision is usually made to discharge the heat. Heat sinks are sometimes mounted directly to logic processors, and other times located distant to logic processors and thermally connected to the logic processors through devices such as heat pipes. A heat sink usually has a fin support and a plurality of fins extended from the fin support. The heat is transferred to the fins, from where the heat is convected to air. Fans often blow air over the fins to accelerate cooling.

A logic processor is usually located with chipsets, graphic chips and other electronic components on a circuit board which is specifically designed to accommodate the logic processor, the electronic components and other components such as electric connectors etc. The logic processor and the other components may from time to time be upgraded to higher-performance components. Should a logic processor be upgraded, its cooling system will also be upgraded. Dedicated cooling is usually not provided for electronic components such as chipsets and graphics chips. Such electronic components have also become more powerful and generate more heat than in the past. It is now required to cool also such electronic devices to ensure their functional integrity.

BRIEF DESCRIPTION OF THE DRAWINGS

The invention is described by way of example with reference to the accompanying drawings wherein:

FIG. 2 is a side view in a direction 2 of FIG. 1;

FIG. 3 is a cross-sectional end view on 3—3 in FIG. 2, further illustrating a computer housing of the computer assembly.

DETAILED DESCRIPTION OF THE INVENTION

A computer assembly is described having a metal plate which provides additional cooling for an electronic component such as a chipset or a graphic chip. The computer assembly may for example be retrofitted with the metal plate. The metal plate has a cross-sectional area which is sufficiently large and is made of a material which provides for a large amount of heat to be conducted. The metal plate is sufficiently thin to allow the metal plate to be bent or otherwise deformed to allow for proper fitting between surfaces that are at different elevations.

Figure 1:
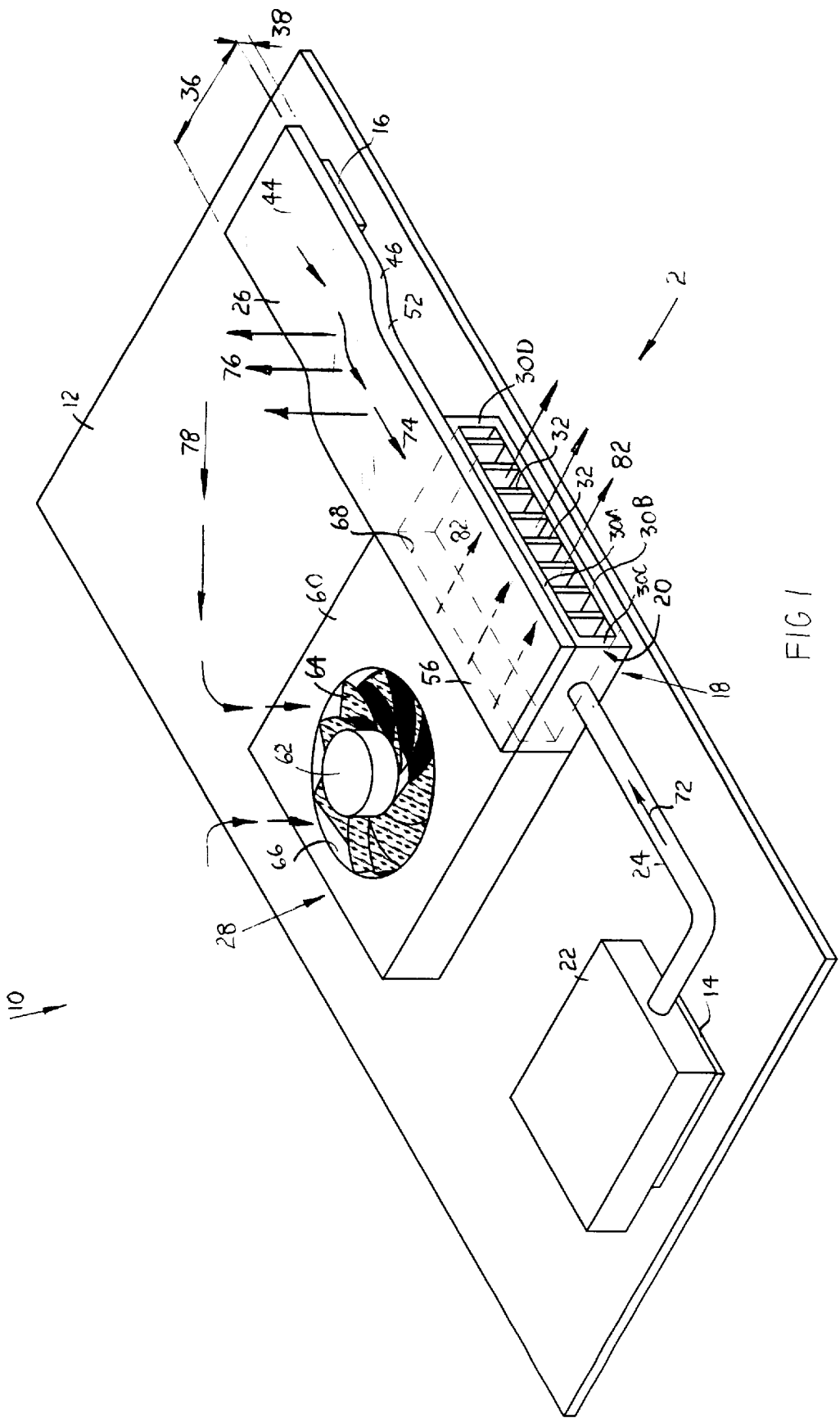
FIG. 1 is a perspective view of components of a computer assembly according to an embodiment of the invention.

FIG. 1 of the accompanying drawings illustrates components of a computer assembly 10 according to an embodiment of the invention. The computer assembly 10 includes a circuit board 12, an electronic component in the form of a logic processor 14, another electronic component 16, and heat dissipating apparatus 18.

The circuit board 12 is typically a multi-layer electronic board having metal lines formed therein and thereon. The logic processor 14 and the electronic component 16 are secured to the circuit board 12 at spaced locations from one another. The electronic component 16 may for example be a chipset, a graphic chip or another electronic component, typically a semiconductor electronic component. The logic processor 14 and the electronic component 16 are electrically connected to circuits of the circuit board 12 so that electronic signals can be transmitted to and from the logic processor 14 and to and from the electronic component 16.

Operation of the logic processor 14 and the electronic component 16 by transmitting signals to and from then, results in heat being generated by the logic processor 14 and the electronic component 16. In order to ensure that the logic processor 14 and the electronic component 16 maintain their functional integrity, it is required to remove heat from the logic processor 14 and the electronic component 16.

The heat dissipating apparatus 18 includes a heat sink 20, a heat plate 22, a heat pipe 24, a metal plate 26, and a fan assembly 28.

The heat sink 20 includes four sidewalls 30 and a plurality of heat exchanging fins 32. The sidewalls 30 include upper and lower sidewalls 30A and 30B and two short sidewalls 30C and 30D which jointly form a rectangular opening. Air can flow through the rectangular opening into one side of the heat sink 20 and leave the rectangular opening through another side of the heat sink 20. Each fin 32 has one side which is attached to the upper sidewall 30A and another side which is attached to the lower sidewall 30B. The fins 32 extend through the rectangular opening in the heat sink 20 in a direction in which air can flow through the rectangular opening. A respective space is provided between respective adjacent pairs of the fins 32. The lower sidewall 30B is located on the circuit board 12 and secured to the circuit board 12.

The heat plate 22 is made of a thermally conductive metal, and is mounted on top of the logic processor 14. The heat pipe 24 has one end that is inserted into and secured to the heat plate 22. An opposing end of the heat pipe 24 is inserted into the heat sink 20. The heat pipe 24 extends through all the fins 32 and is in contact with each fin 32.

The metal plate 26 is made of a thermally conductive metal such as copper. The metal plate 26 has a length of about 100 mm, a width 36 of about 20 mm, and a thickness 38 of about 3 mm. An area provided by the width 36 multiplied by the thickness 38 is sufficiently large to allow for a large amount of heat to be conducted along the length of the metal plate 26. The material of the metal plate 26 is sufficiently malleable and the thickness 38 is sufficiently thin to allow for bending of the metal plate 26.

Referring to FIG. 2, an upper surface of the electronic component 16 is in a plane 40 and an upper surface of the upper sidewall 30A is at a plane 42. The plane 40 is substantially parallel to an upper surface of the circuit board 12. The plane 42 is substantially parallel to the plane 42 and located above the plane 40.

The metal plate 26 is bent to conform to the upper surfaces of the electronic component 16 and the upper sidewall 30. Tolerances in height and positioning of the electronic component 16 and the heat sink 20 are allowed for due to malleability of the metal plate 26 so that the computer assembly 10 can be retrofitted with the metal plate 26.

The metal plate 26 has a first end 44 located against the upper surface of the electronic component 16. The metal plate extends from the first end 44 away from the electronic component and then forms a first bend 46. Following the first bend 46, the metal plate 26 has a section 48 that extends at an angle 50 relative to the plane 40 and away from the plane 40. The metal plate 26 then has a second bend 52 where the metal plate 26 is bent in an opposite direction as at the bend 46. Following the second bend 42, a second end 56 of the metal plate 26 opposing the first end 44, extends substantially parallel to the plane 40. A lower surface of the second end 56 is located against the upper surface of the upper sidewall 30A of the heat sink 20. The second end 56 is thus located against the upper sidewall 30 on a side thereof opposing the fins 32 and the fins 32, in turn, are all contacting the heat pipe 24. The heat plate may be glued in such a position or attached to the circuit board 12 by fasteners such as screws or bolts.

Referring again to FIG. 1, the fan assembly 28 includes a fan housing 60, an electric motor 62, and a plurality of fan blades 64. The fan housing 60 has an inlet 66 in an upper wall and an outlet 68 in a sidewall. The electric motor 62 is mounted to the fan housing 60 and the blades 64 are mounted to the electric motor 62. The blades 64 are all located within the inlet 66. Operation of the electric motor 62 causes rotation of the fan blades 64.

In use, the logic processor 14 and the electronic component 16 are operated so that they generate heat. The electric motor 62 is also operated so that the fan blades 64 rotate.

Heat conducts from the logic processor 14 to the heat plate 22. The heat conducts from the heat plate 22 through a wall of the heat pipe 24. The heat pipe 24 has a wicking layer on an inner surface thereof and moisture that is condensed on the wicking layer. When heat is transferred from the heat plate 22 to the moisture, the moisture evaporates so as to form a vapor in a core of the heat pipe 24. The vapor flows in a direction 72 through the core of the heat pipe 24 to the heat sink 20. Transfer of heat through the heat pipe 24 generally provides a large amount of heat transfer from the logic processor 14.

Heat generated by the electronic component 16 conducts from the electronic component 16 to the first end 44 of the metal plate 26. The heat then conducts from the first end 44 through the bends 46 and 52 in a direction 74 to the second end 56. Some of the heat convects as heat 76 from surfaces of the metal plate 26 to surrounding air. Transfer of heat through the metal plate 26 is much less than through the heat pipe 24, although sufficient to cool the electronic component 16.

Rotation of the fan blades 64 draws air through the inlet opening 66 into an internal volume of the fan housing 60. All air entering into the fan housing 60 enters through the inlet 66. Some of the air being heated by the heat 76 also flows in a direction 78 to the inlet port 66 and enters the fan housing 60 through the inlet 66. The fan blades 64 cause movement of the air from the inlet port 66 through the internal volume in the fan housing 60 out of the outlet 68 of the fan housing 60. The outlet 68 mates with the rectangular opening formed by the sidewalls 30 of the heat sink 20. All air leaving the fan housing 60 passes through the outlet 68 and flows through the rectangular opening formed by the sidewalls 30.

Referring to FIG. 3, the heat that conducted to the second end 56 conducts from the second end 56 through the upper sidewall 30 to the fins 32. More heat conducts from the vapor in the core of the heat pipe 24 through a sidewall of the heat pipe 24 to the fins 32. When heat is transferred from the vapor in the heat pipe 24, the vapor condenses on the wicking layer and flows through the wicking layer back to the heat plate 22 of the FIG. 1. Heat conducts from the second end 56 to all the fins 32 and heat conducts from the heat pipe 24 to all the same fins 32.

Air flows in a direction 82 into the heat sink 20, over the fins 32 and out of the heat sink 20. Heat is convected from the fins 32 to the air. The computer assembly 10 further includes a computer housing 84. All the components shown in FIG. 1 are located within the computer housing 84 and the circuit board 12 is mounted to the computer housing 84. The computer housing 84 has an exit port 86 located over the rectangular opening of the heat sink 20. All the air leaving the heat sink 20 passes through the exit port 86. All the heat that convects from the fins 32 to the air flowing in the direction 82 leaves the computer housing 84 through the exit port 86. It can thus be seen that heat created by the logic processor 14 is transferred through the heat pipe 24 to the fins 32 and then leaves the computer housing 84. Heat generated by the electronic component 16 also conducts through the metal plate 26 to the fins 32 and then leaves the computer housing 84 through the exit port 86. More heat 72 heats air within the computer housing 84 and flows in a direction 78 to the fan housing 60 and then is blown in a direction 84 out of the computer housing 84.

Figure 4:
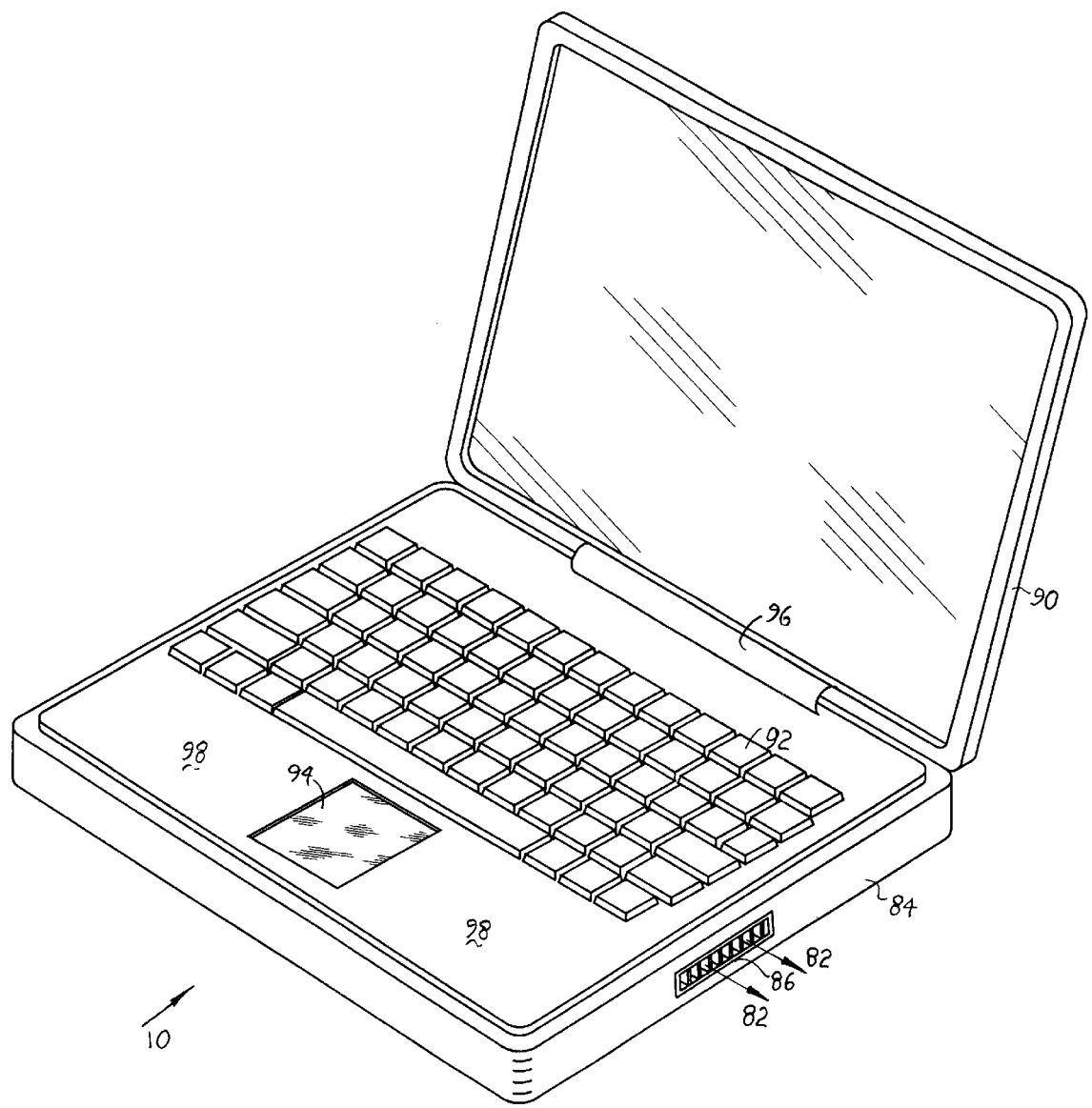
FIG. 4 is a perspective view of external features of the computer assembly.

FIG. 4 illustrates a mobile computer assembly 10 of the kind hereinbefore described. The assembly 10 includes the computer housing 84, screen 90, keys 92 and a track pad 94. The screen 90 is mounted to the computer housing 84 by a hinge 96. An upper surface of the computer housing 84 is relatively large in comparison with its height. The exit port 86 is located on a side of the computer housing 84. Air blown in the direction 82 does not blow towards a user located in front of the computer assembly 10. The screen 90 can fold down onto the upper surface of the computer housing 84 or be rotated up into its position as shown on FIG. 4. In this position as shown in FIG. 4, a user can be located on a side of the computer housing 84 opposing the screen 90 and can view information on the screen 90. The keys 92 are mounted in the upper surface of the computer housing 84 so that the user can access them to enter information by hand. The track pad 94 is mounted in the upper surface between the keys 92 and an edge of the computer housing 84. The user can easily access the track pad 94 and the keys 92 by locating his or her hands on areas 98 on opposing sides of the track pad 94 and on a user-side of the keys 92.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed:

1. A computer assembly comprising:
  a fin support;
  a plurality of heat exchanging fins attached on one side of the fin support;
  a first electronic component generating heat when being operated;
  a first thermal link thermally connecting the first electronic component to the fins;
  a second electronic component, spaced from the first electronic component, generating heat when being operated; and
  a second thermal link in the form of a metal plate thermally connecting the second electronic component through the fin support to the fins that the first thermal link is connected to, surfaces of the fin support and the second electronic component being in different planes and the metal plate being bent at at least one location between the second electronic component and the fin support.

2. The computer assembly of claim 1 wherein the first and second electronic components generate first and second amounts of heat respectively, at least some of the first and second amounts of heat passing through the first and second thermal links respectively, and at least some of both the first and second amounts of heat being transferred to the same ones of the fins, from where at least some of both the first and second amounts of heat are convected to air passing over the fins.

3. The computer assembly of claim 1 wherein the first electronic component is a logic processor.

4. The computer assembly of claim 3 wherein the first thermal link includes a heat pipe.

5. The computer assembly of claim 4 wherein the first thermal link includes a heat plate thermally connected to the logic processor, heat conducting from the logic processor to the heat plate, an end of the heat pipe being structurally secured to the heat plate.

6. The computer assembly of claim 1 wherein some of the heat convects from the metal member directly to surrounding air.

7. The computer assembly of claim 1 wherein the metal member is a metal plate having a length, a width and a thickness, the thickness being less than 50% of the width.

8. The computer assembly of claim 1 further comprising:
a circuit board, the electronic components both being secured to the circuit board.

9. The computer assembly of claim 1 wherein the planes are substantially parallel to and spaced from one another.

10. The computer assembly of claim 1 further comprising:
a fan assembly including a fan housing and blades that are rotatable relative to the fan housing, rotation of the blades causing movement of air and the air blowing over the fins.

11. The computer assembly of claim 10 wherein the fan housing has an inlet through which the air enters the fan housing and an outlet through which the air exits the fan housing, at least 90% of the air exiting through the outlet.

12. The computer assembly of claim 11 further comprising:
a computer housing having an exit port, the fins being located adjacent the exit port and at least 90% of the air passing through the fan housing also exiting through the exit port out of the computer housing.

13. A computer assembly comprising:

a computer housing having an exit port;

a circuit board located within the computer housing;

a fan housing having an inlet and an outlet;

a plurality of fan blades rotatably mounted to the fan housing, rotation of the fan blades causing movement of air through the inlet into the fan housing and out of the outlet out of the fan housing;

a fin support;

a plurality of heat exchanging fins attached to the fin support and located so that at least 90% of the air passing through the fan housing flows over the fins and exits the computer housing through the exit port;

a logic processor mounted to the circuit board and generating heat when being operated;

a heat pipe thermally connecting the logic processor to the fins;

an electronic component mounted to the circuit board at a spaced location from the logic processor and generating heat when being operated; and a thermally conductive metal plate thermally connecting the electronic component to the fins that the heat pipe is connected to wherein surfaces of the fin support and the electronic component against which the metal plate is located are in different planes and the metal plate has at least one bend located between the electronic component and the fin support and wherein the logic processor and the electronic component generate first and second amounts of heat respectively, at least some of the first amount of heat being transferred by a fluid flowing in the heat pipe from the logic processor to the fins and being convected to air passing over the fins and at least some of the second amount of heat being conducted through the metal plate from the electronic component to the fins and being convected to air flowing over at least some of the fins from which the first amount of heat is convected.

* * * * *